(12) United States Patent
Khojastepour et al.

(10) Patent No.: US 10,331,493 B2
(45) Date of Patent: Jun. 25, 2019

(54) SYSTEMS AND METHODS FOR DISTRIBUTED ASSIGNMENT OF TASK IDENTIFIERS

(71) Applicant: NEC Laboratories America, Inc., Princeton, NJ (US)

(72) Inventors: Mohammad Khojastepour, Lawrenceville, NJ (US); Rajesh Mahindra, Sunnyvale, CA (US); Karthikeyan Sundaresan, Manalapan, NJ (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 114 days.

(21) Appl. No.: 15/340,712

(22) Filed: Nov. 1, 2016

(65) Prior Publication Data
US 2017/0123859 A1    May 4, 2017

Related U.S. Application Data

(60) Provisional application No. 62/250,054, filed on Nov. 3, 2015.

(51) Int. Cl.
*G06F 9/48* (2006.01)
*G06F 9/50* (2006.01)

(52) U.S. Cl.
CPC .......... *G06F 9/5083* (2013.01); *G06F 9/4881* (2013.01); *G06F 9/5033* (2013.01)

(58) Field of Classification Search
None
See application file for complete search history.

(56) References Cited

U.S. PATENT DOCUMENTS

| | | | |
|---|---|---|---|
| 6,888,797 B1 * | 5/2005 | Cao | H04L 45/00 370/235 |
| 8,503,456 B2 * | 8/2013 | Matthews | H04L 45/00 370/351 |
| 8,578,027 B2 * | 11/2013 | Brown | G06F 9/505 709/226 |
| 2009/0271798 A1 * | 10/2009 | Iyengar | G06F 9/505 718/105 |

OTHER PUBLICATIONS

DeCandia, et al., "Dynamo: Amazon's Highly Available Key-value Store", Amazon.com, OSP'07, Oct. 2007, pp. 205-220.

* cited by examiner

*Primary Examiner* — Wynuel S Aquino
*Assistant Examiner* — Melissa A Headly
(74) *Attorney, Agent, or Firm* — Joseph Kolodka

(57) ABSTRACT

A system and method are provided. The method includes a base station receiving a plurality of tasks from a plurality of user devices, each of the plurality of tasks involving a respective one of multiple sets of jobs. The method further includes a load balancer generating task allocations for the plurality of tasks, responsive to receiving the plurality of tasks from the base station. A unique task ID is generated for and assigned to each task, from which a task allocation is generated by the load balancer. The task allocations for the plurality of tasks are generated such that all the jobs received from a respective same one of the plurality of user devices are assigned to a same one of the worker entities in the set. The method also includes a set of worker entities performing the plurality of tasks in accordance with the task allocations.

9 Claims, 4 Drawing Sheets

400

Bind an input sequence into a first segment, a second segment, and a third segment.
410

Form a first new segment by performing (i) an operation with the second segment and the third segment, (ii) a first one way function on a key and an output from the operation, and (iii) the operation with the first segment and an output from the one way function.
420

Form a second new segment by performing (i) a second one way function with the first segment and the key, and (ii) the operation with the second segment and output of the second one way function.
430

Form a third new segment by performing (i) the second one way function with the third segment and the key, and (ii) the operation with the second segment and output of the second one way function.
440

Form an output sequence by combining the first new segment, the second new segment, and the third new segment.
450

FIG. 4

SYSTEMS AND METHODS FOR DISTRIBUTED ASSIGNMENT OF TASK IDENTIFIERS

RELATED APPLICATION INFORMATION

This application claims priority to 62/250,054 filed on Nov. 3, 2015, incorporated herein by reference in its entirety.

BACKGROUND

Technical Field

The present invention relates to load balancing and more particularly load balancing on networks.

Description of the Related Art

Load balancing arises in different context, where a task may be performed by multiple workers and the load balancer assigns task to each worker such that their load is balanced. If all the workers have the same capability, as is usually the case, load balancing refers to uniform or almost uniform distribution of the task to the workers. In some other cases, for example, proportional distribution of the load is desirable or the load distribution could be a function of the worker's capabilities. A load balancer is the entity which performs this task.

SUMMARY

According to an aspect of the present principles, a method is provided that load balances tasks on a network. The method includes a base station receiving a plurality of tasks from a plurality of user devices, each of the plurality of tasks involving a respective one of multiple sets of jobs. The method further includes a load balancer generating task allocations for the plurality of tasks, responsive to receiving the plurality of tasks from the base station. A unique task ID is generated for and assigned to each task, from which a task allocation is generated by the load balancer. The task allocations for the plurality of tasks are generated such that all the jobs received from a respective same one of the plurality of user devices are assigned to a same one of the worker entities in the set. The method also includes a set of worker entities performing the plurality of tasks in accordance with the task allocations.

According to another aspect of the present principles, a system is provided. The system includes a base station for receiving a plurality of tasks from a plurality of user devices, each of the plurality of tasks involving a respective one of multiple sets of jobs. The system further includes a set of worker entities for performing the plurality of tasks. The system also includes a load balancer for receiving the plurality of tasks from the base station and allocating the plurality of tasks amongst the set of worker entities such that all the jobs received from a respective same one of the plurality of user devices is assigned to a same one of the worker entities in the set. A unique task ID is generated for and assigned to each of the plurality of tasks, from which a task allocation is generated by the load balancer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a flow diagram illustrating a method for randomization while load balancing in a network, in accordance with an embodiment of the present invention.

DETAILED DESCRIPTION OF PREFERRED EMBODIMENTS

Figure 1:
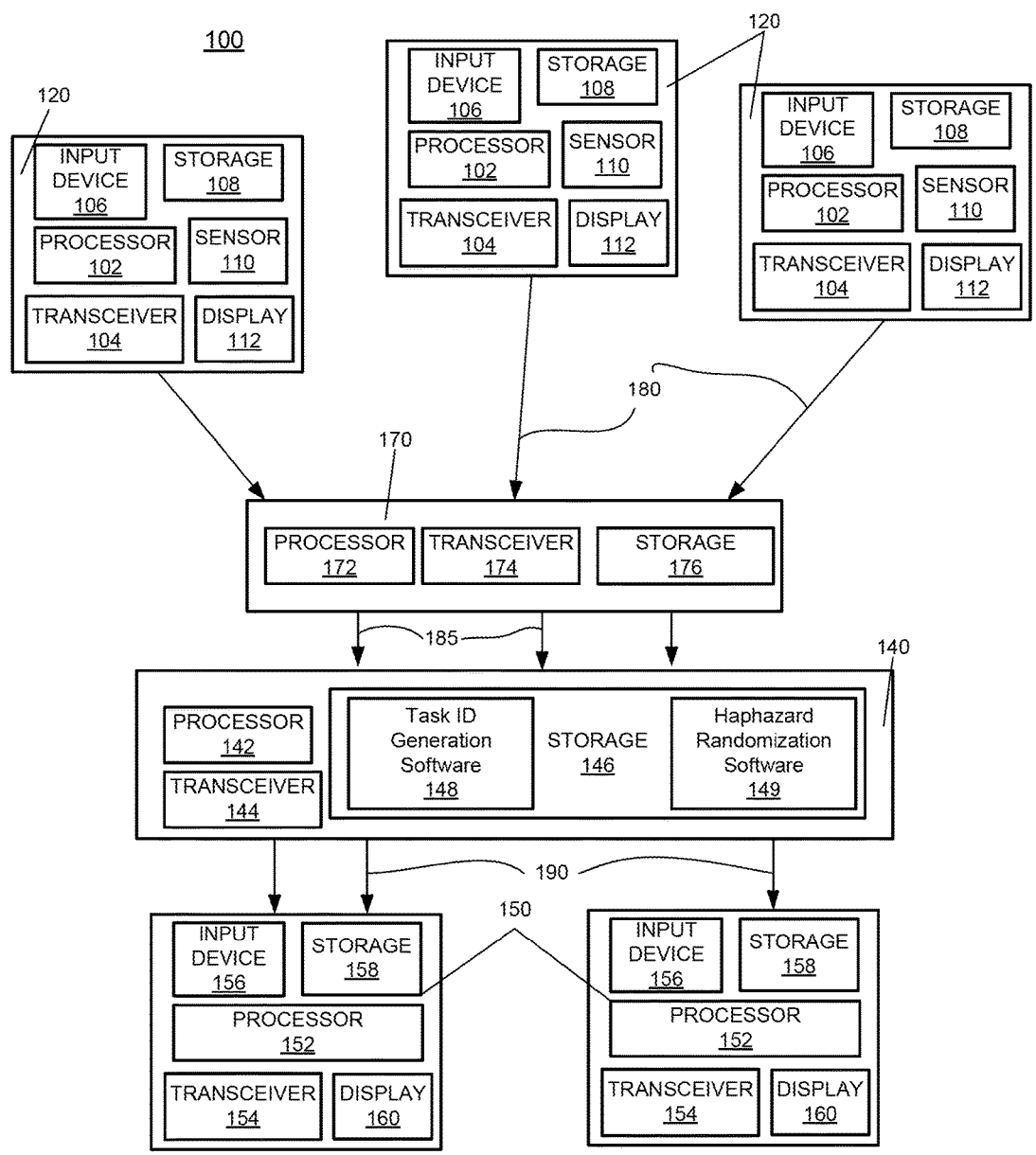
FIG. 1 is a block diagram illustrating a high-level system for a network, in accordance with an embodiment of the present invention.

In accordance with the present invention, systems and methods are provided for load balancing over a network.

There are a number of properties that might be desirable for a server load balancer (SLB) in different scenarios. One property is that a task might have a different referral in time, i.e., a new task or reactivation of an old task might happen and all the referrals need to be assigned to the same worker or worker entity (MMP), which can be an entire server and any subset of a server including a single thread or a virtual machine installation. Another property is that the pool of workers may change over time. This means that workers may retire, go offline for a period before coming back online, or be added to the pool of workers.

Also, in some scenarios it may be desirable for a task to have a backup worker (or multiple backup workers) on standby, which means that the backup worker knows the task and can complete the task when needed.

Each task has an identification (ID) that is valid for a length of a time and then it may change. However, the same task or its referrals should always go to the same worker (or possibly one or more backup workers based on one or more requirements) that is currently assigned to handle the task. A change in task ID might happen for security or privacy reasons. Hence, it is desirable to have a task ID that is random, i.e., a task ID that makes it not possible to derive a valid task ID from another task ID or collection of task IDs.

A task may include multiple threads or jobs. All those jobs should usually be assigned to the same worker. Each job may have a different ID. In some scenarios, a job may have a fixed ID which does not change over time while another job from the same user may have an ID that is required to change over time. It is important for the load balancer to direct all the jobs from the same user to the same worker.

In one embodiment, the way to deploy a load balancer may be to store a table of the job IDs and the workers that have been assigned to them. This means the size of the table should be large enough to accommodate the entire possible pool of tasks and jobs. Moreover, for each new task or job request within a task, the load balancer has to search the pool of active tasks and users to find out where to direct the new request.

In another embodiment, the load balancer may not need to store a table or perform a search to find out where to direct the task. Let us consider a scenario where a pool of worker entities are serving multiple server load balancers (SLB1 or SLB2). Either of SLB1 or SLB2 may be referred to as SLB. SLB receives an attach request from a set of users that we refer to as enhanced node base stations (eNBs) which in turn are serving a number of users (UEs).

The attach request is at least partly handled by the SLB. The SLB uses a haphazard randomization function (HAPH)

to randomize the value of a counter that is appended to an ID of the SLB. For example, each SLB may use a 4 bit ID and a 20 bit counter which can count more than a million numbers. The whole 24 bits are fed into the HAPH as well as a random key that is kept fixed over time. The output of the HAPH is a random number, having a size of 24 bits, that is uniquely determined from the input. This number (pTEID) is an example of a task ID that is assigned and kept fixed over time. In a case that the task ID needs to be changed, we can add extra bits, e.g., 8 bits to the original 24 bits of the pTEID and then use the HAPH algorithm with a fixed key to generate a new task ID (GUTI), having a size of 32 bits. By changing the extra 8 bits in the input, either in a random manner or sequentially, it is possible to change GUTI over time.

It is clear that by generating a GUTI based on a pTEID, two properties are simultaneously satisfied: (1) Given the fact that the HAPH algorithm generates an output that is very different from the inputs, even when two similar input sequences are fed into the HAPH, therefore the pTEID looks very random even though we are using a timer and the ID of the SLB as inputs into the HAPH function; (2) Two different GUTIs that are generated based on the same pTEID are not only random and quite different, but also they can be traced back to the users that the task is assigned to and therefore the task would be sent to the proper worker by the SLB. The reason is that the GUTI can be de-randomized by using the inverse of the HAPH function and then the pTEID is extracted.

Now suppose another task ID (S1AP), also needs to be generated for users. The S1AP can be generated the same way that the GUTI is generated, e.g., by adding extra bits (or not adding extra bits) and then using the HAPH function with a given key (e.g., different from that of GUTI) with the output of the HAPH function being the S1AP. The S1AP could be a new type of task ID that belongs to the same user as that of the pTEID but it is significantly different from the other types of task ID's such as the pTEID and the GUTI. This new ID may or may not change over time.

Referring now in detail to the figures in which like numerals represent the same or similar elements and initially to FIG. 1, a high-level system for load balancing over a network 100 is illustratively depicted in accordance with one embodiment of the present invention. The network 100 includes more than one user device 120. In one embodiment, the user device 120 may include a mobile device, a cell phone, a personal computer, a data center or any combination of these and other networkable items.

The user device 120 may include one or more processors 102. The processor 102 could process sensor or input data of the user device 120. The processor 102 could process the data received by the user device 120 from another user device 120. The user device 120 may include one or more displays 112. The user device 120 may include one or more input devices 106. The input device could be used to accept user commands or data into the user device 102.

The user device 120 may include one or more sensors 110 for making different measurements. The measurements may include gas concentration, pressure, temperature, wind speed, wind direction, speed, acceleration, etc. In an embodiment, the sensor 110 may include one or more of the following: an optical sensor; an infrared (IR) sensor; a camera; an accelerometer or other motion sensor; an electrochemical gas sensor or other gas sensor; a thermocouple; a thermistor; a resistance thermometer; a silicon bandgap temperature sensor or other temperature sensor; and so forth.

The user device 120 may include a transceiver 104. In one embodiment, the transceiver 104 may be coupled to a global position system (GPS) to determine a position of the user device 120 relative to other user devices 120 on a common coordinate system. The transceiver 104 may be equipped to communicate with a cellular network system. In this way, the user device 120 can communicate with anything that is connected to the cellular network, such as, e.g., but not limited to, the Internet. In one embodiment, the cellular network system may be the communication link between the user devices 120. In another embodiment, the cellular network system may be the communication link 180 between the user device 120 and the base station 170 of the cellular network. The transceiver 104 may include a WIFI or other radio system, a local area network, a wide area network, and so forth.

The user device 120 may include memory storage 108. The memory storage 108 may include solid state or soft storage and work in conjunction with other systems on the user device 120 to record data, run algorithms or programs, control the user device, etc. The memory storage 108 may include a Read Only Memory (ROM), random access memory (RAM), or any other type of memory useful for the present applications.

The network 100 includes at least one base station 170. The base station 170 may include one or more processors 172. The processor 172 could process sensor or input data from a user device 120. The processor 172 could process the data received by the base station 170 from another base station 170.

The base station 170 may include memory storage 176. The memory storage 176 may include solid state or soft storage and work in conjunction with other systems on the base station 170 to record data, run algorithms or programs, control the base station 170, etc. The memory storage 176 may include a Read Only Memory (ROM), random access memory (RAM), or any other type of memory useful for the present applications.

The base station 170 may include a transceiver 174. In one embodiment, the transceiver 174 may be equipped to communicate with a cellular network system. In this way, the base station 170 can communicate with anything that is connected to the cellular network, such as, e.g., but not limited to, the Internet. In one embodiment, the cellular network system may be the communication link 185 between the base station 170 and the load balancer 140 of the cellular network. The transceiver 174 may include a WIFI or other radio system, a local area network, a wide area network, and so forth.

The network 100 includes at least one load balancer 140. The load balancer 140 may include one or more processors 142. The processor 142 could process sensor or input data from a user device 120. The processor 142 could process the data received by the load balancer 140 from another load balancer 140.

The load balancer 140 may include memory storage 146. The memory storage 146 may include solid state or soft storage and work in conjunction with other systems on the load balancer 140 to record data, run algorithms or programs, control the load balancer 140, etc. The memory storage 146 may include a Read Only Memory (ROM), random access memory (RAM), or any other type of memory useful for the present applications. In one embodiment, the memory storage 146 make include task ID generation software 148. In another embodiment, the memory storage 146 may include haphazard randomization software 149.

The load balancer 140 may include a transceiver 144. In one embodiment, the transceiver 144 may be equipped to communicate with a cellular network system. In this way, the load balancer 140 can communicate with anything that is connected to the cellular network, such as, e.g., but not limited to, the Internet. In one embodiment, the cellular network system may be the communication link 185 between the base station 170 and the load balancer 140 of the cellular network. The transceiver 144 may include a WIFI or other radio system, a local area network, a wide area network, and so forth.

The network 100 includes more than one worker 150. In one embodiment, the worker 150 may include a mobile device, a cell phone, a personal computer, a data center or any combination of these and other networkable items. In another embodiment, the worker 150 may include a virtual machine or a thread on a processor on a computer system or server.

The worker 150 may include one or more processors 152. The processor 152 could process sensor or input data of the worker 150. The processor 152 could process the data received by the worker 150 from a load balancer 140. The worker 150 may include one or more displays 160. The worker 150 may include one or more input device 156. The input device could be used to accept user commands or data into the worker 150.

The worker 150 may include a transceiver 154. In one embodiment, the transceiver 104 may be equipped to communicate with a cellular network system. In this way, the worker 150 can communicate with anything that is connected to the cellular network, such as, e.g., but not limited to, the Internet. In one embodiment, the cellular network system may be the communication link between the workers 150. In another embodiment, the cellular network system may be the communication link 190 between the worker 150 and the load balancer 140 of the cellular network. The transceiver 104 may include a WIFI or other radio system, a local area network, a wide area network, and so forth.

The worker 150 may include memory storage 158. The memory storage 158 may include solid state or soft storage and work in conjunction with other systems on the worker 150 to record data, run algorithms or programs, control the user device, etc. The memory storage 158 may include a Read Only Memory (ROM), random access memory (RAM), or any other type of memory useful for the present applications. In one embodiment, the memory storage 158 make include task ID generation software. In another embodiment, the memory storage 158 may include haphazard randomization software.

In yet another embodiment, the SLB may not be capable of performing any part of the attach procedure when it receives the attach message, therefore it forwards the attach message to one of the MMPs in order to assign a pTEID and a GUTI to the user as a part of the attachment procedure. The main problem in this case is related to distributed nature of processing the attachment procedure. One of the issues is the way to ensure that the uniqueness of the task IDs (for each type) that are assigned to the users so that there is no conflict with the other user's task IDs. The other issue is that after a worker generates and assigns the task IDs to a user, the next time that the user sends a request with this assigned task ID, the request will be handled and routed by the SLB based on the policy of the SLB, so the request may or may not be routed to the worker that has just created these task ID's as a part of the attachment procedure. Therefore, the rest of the attachment procedure, including anymore generating of IDs and recording of the status of the user, should be performed by the worker who will receive the task from the SLB the next time that the user initiates a task or request. The same worker may complete the attachment procedure and then release this user to the appropriate worker by moving its status to the new worker. It is of course important that the task IDs generated by the worker should satisfy the property so they can be routed to a unique worker by the SLB.

In this scenario different strategies may be used by the workers. One approach is to use a worker's ID as a basis to differentiate between the generated task IDs by different workers. The worker's ID could be a part of the task ID, or the worker can feed the ID appended with a fixed number of bits, generated randomly or sequentially by a counter, to the HAPH function of appropriate size and use a key that is shared among all the workers and the SLB. This way, some properties are simultaneously satisfied: First is that the assigned task IDs would be random and cannot be traced back in time. Second is the confidentiality of task IDs by not revealing what worker generated it, as well as not allowing a third party to know if two task IDs (even the same type when the task ID changes over time) belong to the same user. Third is the fact that the task ID would take a uniformly random value over the range of possible task IDs. The third property is used for example in some load balancing algorithms and it also allows for fair distribution of the tasks between the workers.

In one embodiment, the generation of different types of task IDs by the worker, similar to previous cases, use the HAPH function to randomize the value of a counter that is appended to an ID of the worker. For example, each worker may use an 8 bit ID and a 16 bit counter which can allow generation of up to 65536 task IDs for users that are currently active in the system. The HAPH function is used to randomize these 24 bits as an input using a key that is fixed and known to all the workers and the SLBs. The output of the HAPH function is a random number with size of 24 bits that is uniquely determined from the input. This number is an example of a task ID (pTEID) that is assigned and kept fixed over time. In case that the task ID needs to be changed, we can add extra bits, e.g., 8 bits to the original 24 bits of the pTEID and then use the HAPH algorithm with a fixed key to generate a new task ID (GUTI), having a size of 32 bits. By changing the extra 8 bits of the input, randomly or sequentially, it is possible to change the GUTI over time. The same can also be done to generate another task ID (TEID) that is 32 bits by using the HAPH algorithm but with a different key. The key for generating each type of these task IDs, e.g., TEID, pTEID, or GUIT would be different but they are fixed across the whole system of workers and SLBs.

Whether or not, the HAPH algorithm is used in the generation of the task IDs, all the generated task IDs have to be kept in a table by the worker. This table is used every time that the worker wants to generate a new task ID in an attachment procedure to ensure that the new user receives a different task ID from the other users in the system. This table has to be modified and updated when a new user is successfully attached, in which case the worker who has received the attach message would be aware of it. However, if a user receives its task ID from a worker but then releases the user to another worker, the worker which is handling this user should forward the detach message to the first worker so that the first worker can free up the task ID of the detached user from its table.

Figure 2:
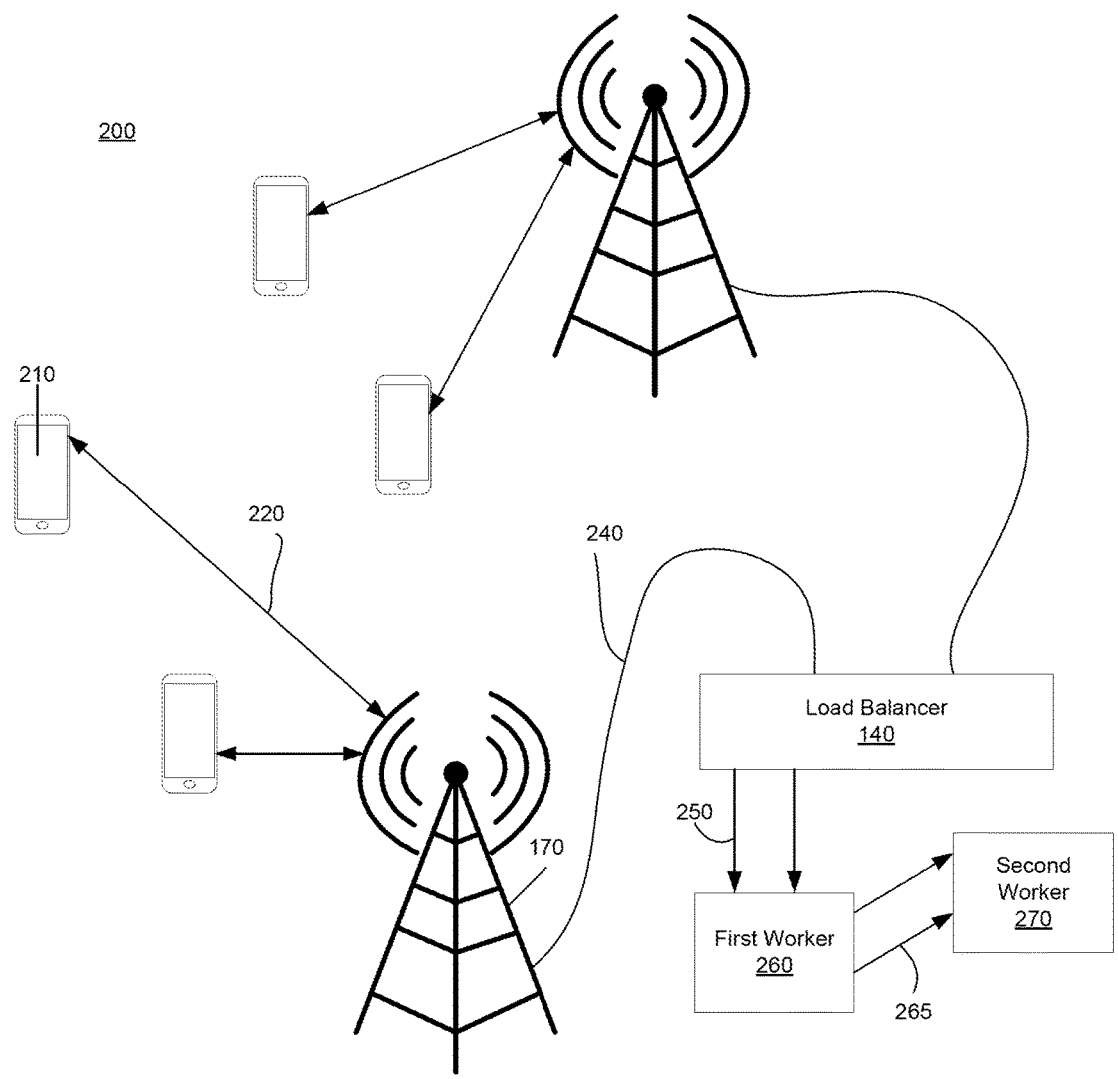
FIG. 2 is a block diagram illustrating a system for cell phones connected in a network, in accordance with an embodiment of the present invention.

Referring to FIG. 2, a network system 200 is illustratively depicted, in accordance with an embodiment of the present invention. The network system 200 may include a cell phone 210. The cell phone 210 may send data and information over a communication link 220. The communications link 220 may include a cellular based or a WIFI based link. The cell phone 210 is communicating with a base station 170. The information or data sent from the cell phone 210 to the base station 170 is transmitted by another communication link 240 to a load balancer 140. The load balancer 140 routes the information or data over the final communication link 250 to a first worker 260. The first worker 260 forwards the information or data over a worker communication link 265 to a second worker 270. The second worker 270 processes the information or data from the cell phone 210.

Figure 3:
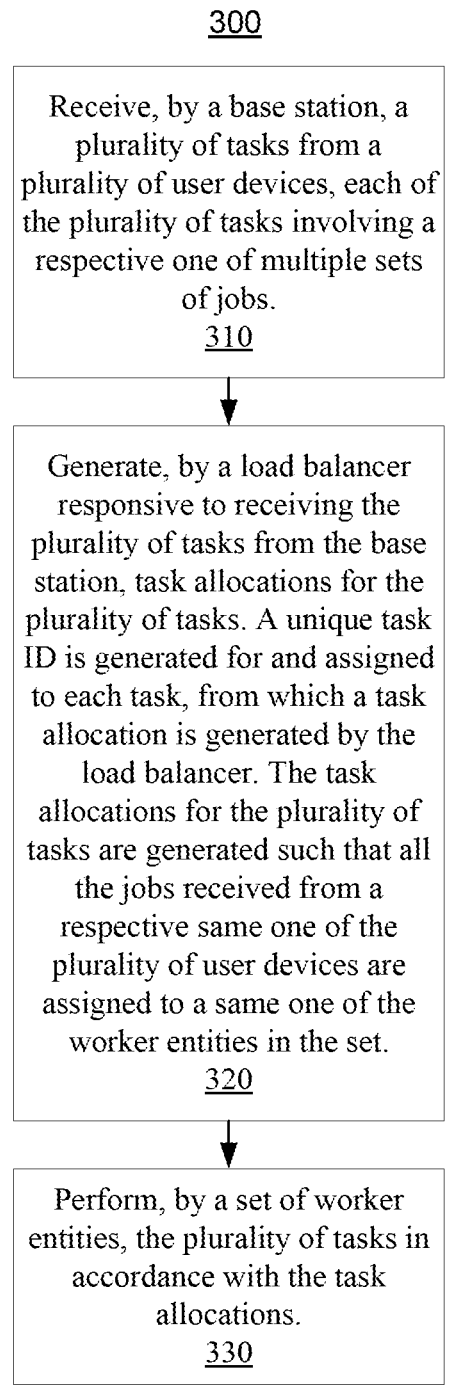
FIG. 3 is a flow diagram illustrating a method for load balancing in a network, in accordance with an embodiment of the present invention.

Referring to FIG. 3, a flow chart for a method 300 of load balancing is illustratively shown, in accordance with an embodiment of the present invention. It is to be appreciated that the steps of method 300 are performed on a network 100. In block 310, receive, by a base station, a plurality of tasks from a plurality of user devices, each of the plurality of tasks involving a respective one of multiple sets of jobs. In block 320, generate, by a load balancer responsive to receiving the plurality of tasks from the base station, task allocations for the plurality of tasks. A unique task ID is generated for and assigned to each of the plurality of tasks, from which a task allocation is generated by the load balancer. The task allocations for the plurality of tasks are generated such that all the jobs received from a respective same one of the plurality of user devices are assigned to a same one of the worker entities in the set. In block 330, perform, by a set of worker entities, the plurality of tasks in accordance with the task allocations.

In one embodiment, the attach message may be forwarded by the SLB to a random worker, there may be other strategies that ensure the uniqueness of the distributed processing of tasks by the workers that does not depend on using the worker's ID. Here, the distinction between the task IDs generated for different users come from the fact that each worker is aware of the SLBs strategy and knows the span of all possible task IDs that will be routed to it. Furthermore, the worker has the status of all the current users in a table stored in the memory. Hence, when a new attach request is received from a user through the SLB, the worker just picks a task ID in its span that is not currently assigned to a user in its table. This worker can complete the attach procedure by choosing the right task ID in its span to ensure that future tasks from this user would be received by this worker.

In another embodiment, different types of task IDs are generated by the worker. We use the HAPH function as it was the case in previous example but in slightly different way. The key idea in this approach is that each worker has a particular span for the task IDs of each type. The span for different types of task IDs may be tied together by a function. For example, a task ID may be randomized using HAPH algorithm or an encryption algorithm (or hash algorithm) with a particular key and the value of the function (HASH) that lie in different intervals are associated with particular workers. This approach is especially beneficial when multiple task IDs that are supposed to go to the same worker are all generated based on a single shared token such as pTEID. For example, let us use the same relation as described before between pTEID, TEID and GUTI as follows: We assume pTEID is the shared token of size 24 bits and the HAPH function is used to randomize this 24 bits as an input using a key that is fixed and known to all workers and SLBs to generate the HASH value. The GUTI, with size of 32 bits, is generated by adding extra bits, e.g., 8 bits to the original 24 bits of the pTEID and then use the HAPH algorithm with a fixed key. By changing the extra 8 bits in the input, randomly or sequentially, it is possible to change the GUTI over time. The same can also be done to generate the TEID, that is 32 bits, by using the HAPH algorithm but with a different key.

Using the mentioned relation between task IDs that are all generated from the same root or token, it is possible to define the span for each worker by using a single value that is the token itself or a function of it. Let us assume the HAPH function is used to generate the HASH. After the attach request is sent to a worker, the worker generates a value within its span that is a new HASH value and it does not exist in the list of the users that are attached to this worker. This HASH value can be de-randomized using the inverse of HAPH function using the same key in order to generate pTEID. This pTEID is then used to generate all the required types of task IDs.

In the scenario of assigning the pTEID by the worker, it is possible to directly use the pTEID as the HASH value. The reason is that the pTEID is chosen randomly from the available span for the worker, i.e., if it has not been already assigned to a user. Since the pTEID is already randomized, there is no need to randomize it again using, e.g., HAPH function or inverse of HAPH function. Nonetheless, if the security of the system could be compromised, it is still recommended to use an inverse HAPH function to get the pTEID from the HASH value that is picked from the available span of the worker.

In another embodiment, the attach message may be forwarded by the SLB to one of the workers, e.g., picked at random, as we discussed in previous section. As long as the task ID assignment is handled by the workers, e.g., MMPs, or by the load balancer, it is always possible to choose them in such a way that they satisfy certain conditions. For example, the distribution of the task IDs could be uniform over a certain span, or we can ensure that the task ID or part of the task ID or a function of the task ID (e.g., HASH value) reside in a certain set or span.

In the previous case, the distinction between the task IDs generated for different users were based on generating a pTEID in the span of the worker that receives the attach message. However, the first message (the attach request contains a task ID or the user ID (IMSI)) and in some scenarios this ID may be used by some entities to contact a worker in the pool. As discussed before, all the tasks belonging to the same user or related to the same user should be handled by the same worker and the SLB has to make sure that they go to the same worker. After the attachment, the subsequent messages from some different entities, for example the eNB and S-Gateway, are using the assigned task IDs generated by the worker, for example the GUTI and the TEID, respectively. However, some entities, may continue to use the IMSI.

Since all generated task IDs of different types are based on unique tokens such as the pTEID, and hence they can be tracked back to a single worker, the IMSI is not generated by the worker and hence does not automatically have this feature. Moreover, in some scenarios, the pTEID has to be uniquely provided by the worker in a distributed manner. The IMSI and pTEID are two separate identifiers that need to be somehow linked together. The size of the pTEID and the IMSI might be different. For example the pTEID might be 24 bits while the IMSI could be 64 bits. This means that the HASH function or randomization function for the pTEID and the IMSI could be different. The HASH value generated for the purpose of load balancing has to be uniform for both the pTEID and the IMSI. Since the pTEID is generated by the system it can directly be generated to satisfy certain condition, for example, to be uniform within the span, but the IMSI does not automatically have this condition and in some scenarios has to be hashed or randomized in order to make the HASH value uniform over the HASH ring or the span of HASH values.

A solution to satisfy the above condition is to have two separate hashing or randomization schemes for treating the pTEID and the IMSI. Both hash rings are slotted and there is a one to one correspondence between the slots in two hash ring. By using this slotted hash ring, the attach request that is based on the IMSI may be forwarded to the worker whose span contains the slot in which the HASH value of the IMSI in the attach request lies. Of course, the subsequent messages or tasks that use the IMSI as ID would go to this slot all the time, and depending on whose worker is responsible for this slot at a time, the same worker will receive the messages or tasks.

During the process of the attachment request, the worker, that is processing the attach request and is the owner of the corresponding slot in HASH ring, generates a pTEID such that the HASH value of the pTEID is in the corresponding HASH ring belonging to the slot that is the corresponding slot for the HASH values of the IMSI. This pTEID is generated in such a way that the corresponding HASH value is within the HASH slot and has not been assigned earlier.

One issue with this approach is that the number of IMSI with a HASH value within a HASH slot might be different (for example higher) from the number of pTEID with a hash value in the corresponding HASH slot. Hence, depending on the size of the slots, a pTEID might not be available in a slot when a new attach request is received. However, the probability of this is very low unless the system is operating close to its limit in terms of the total number of pTEIDs that can be assigned.

In order to avoid storage of a routing table, the load balancer only relies on a table of HASH value intervals that define the span of HASH values for all workers. In order to route a task correctly within its session with a particular worker, task IDs will be used in the following manner. First, depending on the type of the task ID, the task ID will be de-randomized using the correct key. Next, the pTEID will be extracted and using the randomization algorithm it is encoded again into the HASH value. Based on the table of HASH value intervals, the task is routed to the worker responsible for this task ID.

In another embodiment, the SLB may pick a random number (HASH value), based on the message identifier (GUTI, TEID, or S1AP). The random number is in a specified range (HASH ring) and the HASH value is uniform, meaning that even if identifiers are sequential, the corresponding HASH value generated by any function (it might be a hash function, or a randomization function as proposed) is uniformly distributed in the HASH ring.

In yet another embodiment, the SLB may include a table which defines different intervals of HASH value to be assigned to different workers and redirect the message to the worker when the HASH value lies in its interval.

In one embodiment, each user may have a fixed pTEID and all message identifiers will be generated from the user's pTEID. The pTEID may be 24 bits since the GUTI is 32 bits and we require it to change in time and reserve 8 bits to be able to generate 256 possible GUTIs. GUTI may be generated as HAPH (pTEID+(8 extra bits), key1) where key1 is the key and HAPH is a randomization function. TIED and SLAP may also be generated similarly, e.g., HAPH (pTEID+(8 extra bits), key2) where key 2 is different from key1. When the security of TEID is not an issue, we can ignore randomizing and directly using "pTEID+(8 extra bits)" as TEID.

In one embodiment, the SLB may generate a random HASH value. The SLB may use the HASH value to find the corresponding MMP based on a table. The MMP may know its interval in HASH ring. The MMP may pick a uniformly random value in this interval as HASH value that has not been used for any other MMP in the range. The HASH value may be used directly as pTEID. The TEID, the GUTI, and the S1AP may all be generated based on this pTEID. The user status may be saved.

In another embodiment, the SLB may randomly select an MMP and forward attach request to this MMP. Each MMP has a unique ID. The MMP uses its unique id (say 8 bits) and an extra 16 bits to feed 24 bits into HAPH function with a key (GenKey). The originating MMP has a table of all previously assigned pTEID by this MMP. The output of HAPH function is checked against this table. The HAPH function is repeated until a value is generated that is not in the table. The pTEID can be used as hash value directly or the value of pTEID can be hashed with a hash function. The TEID, the GUTI, and the S1AP are all generated based on this pTEID. A status is also generated. The originating MMP knows the interval of all MMPs in the HASH ring. Based on the HASH value, the originating MMP forwards the status to the corresponding MMP. The corresponding MMP has to let the originating MMP, who generated the pTEID, know when the user is detached so that the originating MMP can free up the pTEID value in its table.

In yet another embodiment, the SLB partially addresses the attach request by generating the pTEID. Each SLB has a unique ID. The SLB uses its unique id (say 4 bits) and an extra 20 bits to feed 24 bits into HAPH function with a key (GenKey). The SLB has a table of all previously assigned pTEID by this SLB. The output of HAPH function is checked against this table. The HAPH function is repeated until a value is generated that is not in the table. The pTEID can be used as hash value directly or the value of pTEID can be hashed with a hash function. The TEID, the GUTI, and the S1AP are all generated based on this pTEID. A status is also generated. The SLB knows the interval of all MMPs in the HASH ring. Based on the HASH value, the SLB forwards the status to the corresponding MMP. The SLB has to update the pTEID table when the user detaches.

In one embodiment, the consistent hashing concept is used with slight modification. When a request has to be forwarded based on an ID (ID could be any part of the incoming message) the consistent hashing generates a uniformly random number (called HASH value) based on this ID.

If this ID is generated elsewhere, the use of the hash function is vital. If the ID is generated for the first time by the same system where the load balancer is involved, the ID itself can be generated such that it satisfies the uniformly random property and hence it can be directly used as HASH value. However, if the size of the ID it too large, it is desirable to use a hash function (this hash function is not reversible) to generate a smaller value as hash.

The generation of uniformly random number may involve the use of a hash function or a HAPH function. Therefore, even though the SLB or the MMP generates the ID, in order to make sure the uniform random property, we may still use the output of a hash function. This is related to a concept called "randomness extractor", that is often simply called an "extractor", which is a function such that when it is being applied to a weakly random sequence or even a deterministic sequence, together with a short value, it generates a highly random output that appear independent from the source and is uniformly distributed.

The HAPH function or randomization algorithm is a function that satisfies the following properties: (1) It provides a unique and reversible B-bits output for every input of size B-bits (it is a one-to-one function). (2) The function is easy to compute. (3) The reverse function is also easy to compute if the key is known. (4) The function could be highly nonlinear to make the key hard to guess by an adversary. The complexity of finding the key should be of the order of $2^C$ evaluation of the randomization function even if the function and its algorithm are completely known and an adversary has access to multiple pairs of input and outputs. Here, the key is a binary number of size C bits and usually B=C.

In some cases, a good randomization function with an input of 24 bits is needed. In general, an approach to design a randomization function may include some one way function, e.g., a function that has larger input set than the output set. An example of such function is a function that takes for example b bits and spits out q bits where b>q. However, in order to have reversible randomization function, one needs to ensure that the input can be derived in polynomial time from the output. A way to ensure this is to have round functions that are invertible and use multiple rounds to acquire enough randomization.

Given that a round function generates a one to one correspondence between its output and input, the role of one way function would be to generate more confusion between output and input. A very strong way to design a round function is to find a way that a single bit change in the input affects as much bits in the output as possible. To this end, it is desirable to have a round function where not only a single bit but also any given sub-block of the input cannot be found directly from one sub-block of the output and the key.

In one embodiment, the randomization function may have an input block consisting of 24 bits that are divided into three sub-blocks or bytes. Usually there is a one way function of the key that is applied to the input of the rounds. This operation could be as simple as XOR operation with part of the key or in more involved function like modulo operation such as multiplication, addition, or division. This way the input bits are already masked with the key. After the one way operation on the input, there are two one way functions U and V that take a byte and a key of length for example 32 bits and output 8 bits. The output of the one way functions is then used to further mask the input sub-blocks. At the output, the order of the sub-blocks is changed before going to the next round such that the same operation does not apply to the same byte orders in two consecutive rounds.

In another embodiment, the randomization function may have the input bits masked through a reversible function and then fed into one way functions and masked again. This is a particular important step if only a limited number of rounds is used. For example, if only one round is used, without masking the input and the output to the one way function V, the one way function V would be readily available if we have access to one input and output pair. The reason is that by doing XOR on the first sub-block of the input and the output we have the output of the one way function of V. Also, performing XOR on the next two sub-block of the output gives access to the input of the function V.

In general, the idea of multiple (or possibly all) bits in the output being affected by a single bit change of the input or the key implies that no input sub-block can be obtained solely based on the some output sub-blocks and knowledge of the key unless we use the entire output sub-block. We refer to this idea as "total confusion". This can be possibly achieved through some one-to-one functions as well. For example, modulo multiplication or multiplication in finite fields by a full rank matrix has the property that every input bit can possibly affect all the output bits. However, if a one-way function is going to be used, the idea of total confusion has to be implemented in a very delicate way. In fact the idea of total confusion somehow works against using the one way functions in a randomization function. Since the one way function can be computed only if its input is fully known, therefore, in a decryption process, aside from the knowledge of the key we have to make sure that the input to the one way function can be found. This means that this input has to be computed based on the output of this round. On the other hand in the encryption process, this input to the one way function was found based on the input of the round. This means that there would be a function of the output sub-blocks that is identical to a function of the input sub-blocks. We call such pair of functions, "literal function" for this round function.

Although a randomization function that includes one way functions can still have "total confusion" properties, but note that the existence of a literal function for such a randomization function means that there is a relation between the input bits of a round that can be found through a function of output bits of the same round. Nonetheless, by changing the order of the sub-blocks (or possibly permuting the bits) and using a second round, the relation between the input bits and the output bits of the second round would not be trivial and this could be made exhaustively hard in the order of the cardinality of the key space.

In yet another embodiment, the randomization function may have multiplication and division modulo 257, which is a prime number, before and after the one way functions. We do not include zero as an input and output, and consider only 1 through 257 numbers. The actual value of the byte in the range 1-256 represent the number 1 through 256 and the value zero for the byte represents 257. This means that when the byte has the value 0x00 it is interpreted as 257 in the multiplication and when the result of the multiplication of two numbers is 257 it is stored as 0x00 in the output. The same things hold for the division.

Since the division and multiplication of two bytes possibly affect the entire byte, the relation between the input and output bits does not reveal a relation in bit level, and it is rather in byte level. On the other hand using an XOR or another one way function at the beginning of the round makes it impossible to find out a relation between the input bits solely based on the output even if a single round is used.

If there is no strong requirement on the encryption strength of the algorithm and the algorithm is solely used for the purpose of randomization with moderate or low encryption strength, a single round of the above algorithm may suffice to achieve good randomness in the output.

Referring to FIG. 4, a flow chart for a method 400 for randomization while load balancing in network system 100 is illustratively shown, in accordance with an embodiment of the present invention. It is to be appreciated that the steps of method 400 are performed on the network 100. In block 410, bind an input sequence into a first segment, a second segment, and a third segment. In block 420, form a first new segment by performing (i) an operation with the second segment and the third segment, (ii) a first one way function on a key and an output from the operation, and (iii) the operation with the first segment and an output from the one way function. In block 430, form a second new segment by performing (i) a second one way function with the first segment and the key, and (ii) the operation with the second segment and output of the second one way function. In block 440, form a third new segment by performing (i) the second one way function with the third segment and the key, and (ii) the operation with the second segment and output of the second one way function. In block 450, form an output sequence by combining the first new segment, the second new segment, and the third new segment.

The execution time of randomization function can be greatly enhanced by using proper techniques in implementing different operation. In general bit XOR, AND, OR, ADD (addition), SUB (subtraction) and MOV (move) operation are very fast (1 CPU cycle in registers and 1+memory access cycles if one operand is in memory).

Modulo multiplication and modulo division can be performed without need to do multiplication directly. Multiplication is usually an expensive operation in terms of CPU cycles (in the order of 10s or even 100s of CPU cycles). The idea is to pick a value in the field that is prime value with respect to the size of the filed. For example 2 is prime with respect to 257 and 1+x is prime with respect to X^8+1. Hence, we can write all the elements of the filed in terms of this prime value in the form of g^k(v) where v is an element of the filed, g is the prime value, and k(v) is the exponent of g for a given v such that v=g^k(v). Here, k(v) is called the primitive root of v.

In order to do modulo multiplication of v and u, it is sufficient to find k(v) and k(u) by using a look up table and then find the inverse of k(v)+k(u) by using the inverse table which is u·v where "·" represents modulo multiplication.

In order to do modulo division of v by u, we find k(v) and k(u) by using a look up table and then find the inverse of k(v)−k(u) by using the inverse table which is u/v where "/" represents modulo division. We note that in case that the above number, i.e., k(v)−k(u) is negative we can add 256 to it since any number to the power of 256 modulo 257 would be equal to 1. This is equivalent to multiplying the result by one. However, this would generate a number that is in the range of 0 to 256 which means that we can find the corresponding result of the modulo division in terms of an integer number. Both modulo multiplication and modulo division need only two MOV and one ADD operations.

Some operations may be more involved, however, they can be still performed in very efficient manner. A bit permutation is an example of such function. Let us consider a bit permutation of one word that consists of 4 bytes. In order to perform any (but fixed) permutation, it is sufficient to generate 4 tables with 2^8=256 entries where each entry is a word (4 bytes). For a given input word, each of the four bytes point to 4 locations in their corresponding table. The result of the permutation would be the OR operation of these 4 words. The table can also be designed in such a way that the permutation would be the AND operation of these 4 words. The permutation operation requires one MOV and three OR operations.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method of load balancing tasks on a network, the method comprising:
    receiving, by a base station, a plurality of tasks from a plurality of user devices, each of the plurality of tasks involving a respective one of multiple sets of jobs;
    generating, by a load balancer responsive to receiving the plurality of tasks from the base station, task allocations for the plurality of tasks;
    performing, by a set of worker entities, the plurality of tasks in accordance with the task allocations; and
    wherein a unique task ID is generated for and assigned to each of the plurality of tasks, from which a task allocation is generated by the load balancer; the unique task ID of the plurality of tasks is generated using a randomization function, the randomization function generation including:

binding an input sequence into a first segment, a second segment, and a third segment;

forming a first new segment by performing (i) an operation with the second segment and the third segment, (ii) a first one way function on a key and an output from the operation, and (iii) the operation with the first segment and an output from the one way function;

forming a second new segment by performing (i) a second one way function with the first segment and the key, and (ii) the operation with the second segment and output of the second one way function; forming a third new segment by performing (i) the second one way function with the third segment and the key, and (ii) the operation with the second segment and output of the second one way function; and forming an output sequence by combining the first new segment, the second new segment, and the third new segment, and at a later time, adding a number of additional bits to the unique task ID, using the randomization function with a fixed key to generate a new task ID, said new task ID having a size equal to a size of the unique task ID plus the number of additional bits;

wherein the task allocations for the plurality of tasks are generated such that all the jobs received from a respective same one of the plurality of user devices are assigned to a same one of the worker entities in the set.

2. The method of claim 1, wherein the operation includes a logical exclusive OR operation.

3. The method of claim 1, wherein the operation includes a mathematical operation selected from the group consisting of modulo multiplication and modulo division.

4. The method of claim 1, wherein the randomization function is selectively iteratively repeated based on one or more criterion, such that the output sequence of a particular iteration of the randomization function is the input sequence for a following iteration of the randomization function.

5. The method of claim 3, wherein the following iteration of the randomization function uses a different key.

6. The method of claim 1, wherein the unique task ID for each of the plurality of tasks is generated using a randomization function, wherein the randomization function comprises a set of iterations selectively performed based on one or more criterion, wherein the randomization function uses a round function, an input sequence, and a key to generate an output sequence, such that the output sequence of a particular one of the iterations is the input sequence of a subsequent one of the iterations, and wherein the round function is configured to prevent recovery of a partial input sequence through an invertible function using a partial output sequence and the key.

7. The method of claim 1, wherein the allocating the plurality of tasks amongst the set of worker entities uses a digest of task identifiers to assign all the jobs received from a respective same one of the plurality of user devices to the same one of the worker entities in the set.

8. The method of claim 1, wherein the unique task ID for each of the plurality of tasks is generated using a common token associated with each of the plurality of tasks.

9. The method of claim 1, wherein the unique task ID for each of the plurality of tasks is generated based on a user device ID.

* * * * *